Jan. 2, 1940. C. F. PRUTTON ET AL 2,185,422
THERMOSTATIC DEVICE
Original Filed March 24, 1932

INVENTOR
Carl F. Prutton
John T. Marvin
BY
ATTORNEY

Patented Jan. 2, 1940

2,185,422

UNITED STATES PATENT OFFICE 2,185,422

THERMOSTATIC DEVICE

Carl F. Prutton, Cleveland Heights, and John T. Marvin, Fairview Village, Ohio, assignors to The Patrol Valve Company, Cleveland, Ohio, a corporation of Ohio Original application March 24, 1932, Serial No. 600,888. Divided and this application January 14, 1936, Serial No. 59,116

1 Claim. (Cl. 236—99)

This invention relates to thermostatic operating elements, and in particular thermostatic operating elements which are intended for high temperature work, and in which the expansion of thermo-sensitive liquid is utilized as a source of power, the present application being a division of our copending application, Serial No. 600,888, filed March 24, 1932.

In the construction of thermostatic devices, one of the objects ordinarily sought for is that of obtaining a considerable movement of the heat responsive element over a given temperature range; or stated in other words, sensitivity is an important factor in the construction of thermostatic devices.

The use of the fluid pressure thermostat has been confined principally to low temperature work, for the reason that the known thermo-sensitive fluids previously used by others are objectionable on one or more of the following grounds: high cost, low boiling point, high freezing point, low decomposition temperature, high vapor pressure, toxic properties, and for other reasons as will be hereinafter pointed out.

One of the objects of this invention is to provide a fluid pressure-operated thermostat having a bulb or heat responsive tip constructed so as to rapidly absorb and dissipate heat in a device of the type disclosed.

Another object of this invention is to provide means to control and maintain the maximum temperature of the thermo-sensitive fluid within certain prescribed limits.

Another object of this invention is to provide a thermo-sensitive liquid which has a high boiling temperature, which is chemically stable at temperatures considerably above its boiling point, which has a low latent heat of vaporization, which has a low freezing point, which is non-corrosive to the metal used in the construction of the valve, which is non-toxic, and which is inexpensive and readily obtainable in a relatively pure state.

A further object of this invention is to provide, in a device of the type described, a container for a thermo-sensitive liquid which is relatively stable to such liquid at relatively high temperatures.

Stated in general terms, our invention consists in the provision of a fluid pressure-operated thermostatic valve having a heat responsive bulb which is adapted to transmit to a thermo-sensitive liquid a limited amount of the heat to which it is subjected. An important feature of our invention is the provision of a thermo-sensitive liquid which is peculiarly adapted for high temperature work.

With these and other objects in view, the invention consists in the novel construction, arrangement and combination of parts, hereinafter described, illustrated in some of its embodiments in the accompanying drawing, and particularly pointed out in the appended claim.

Figures 1, 2:
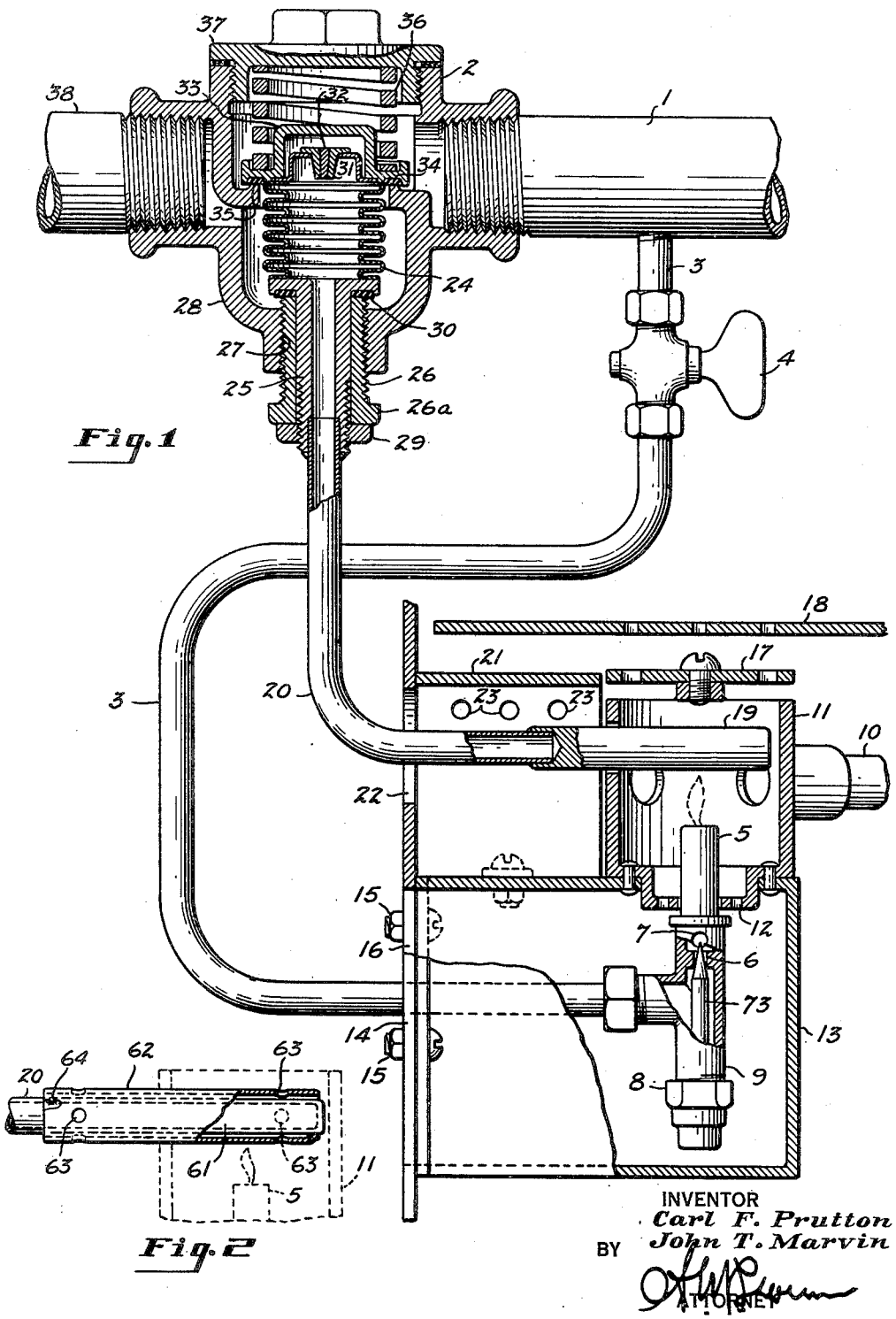
Figure 1 is a side elevational view, partly in section, of a valve structure illustrating one mode of practicing our invention.
Fig. 2 is a modified form of the thermostatic tip or bulb.

The specific form of valve illustrated in this application corresponds to the valve described and claimed in United States Letters Patent No. 1,971,704 of Leger S. Castonguay, granted August 28, 1934.

Referring to Fig. 1 of the drawing, the numeral 1 indicates a gas supply line which communicates with the inlet side of a thermostatic valve 2. A bypass conduit 3 under control of a valve 4 is connected to the gas supply line 1 at a point ahead of the valve 2 for supplying gas to a constantly operating pilot burner 5. The pilot burner 5 is of the blue flame type, and it is provided with a gas injection port or orifice 6 and air ports 7 adjacent thereto, for supplying a combustible mixture of air and gaseous fuel to the pilot burner.

The orifice 6 is formed in the valve body 9 and is under control of a valve needle 13. The needle 13 may be adjusted as desired upon the removal of the closure cap 8, provided at the bottom of the valve body 9 which forms a housing for the valve parts. The pilot burner 5 is provided for the ignition of a plurality of gas burners (not shown) which, when supplied with gas, inject a certain amount of it into the flash tubes 10, whereupon the gas escapes from such tubes into the interior of the cup 11, where it comes in contact with the flame of the burner 5 and produces a flash-back in the flash tube, thereby effecting the ignition of the gas burner which is injecting gas into such tube.

The pilot housing 11 is provided with air inlet openings 12 adjacent the bottom thereof. These air inlet openings communicate with the interior of a casing 13. The casing is secured by the bolts 15 to a wall 14 of the appliance upon which the device is used. The appliance wall 14 is provided with an opening 16, registering with the casing 13, for supplying relatively cool and fresh air to the pilot 5. Above the pilot housing 11 there is provided a perforated plate 17, which serves as an added protection against the extinguishment of the flame of the pilot burner. The top plate of the appliance is illustrated at 18.

The flame of the pilot burner is directed against a thermostatic bulb or tip 19, which is in heat conducting relation with the tube 20. The tube 20 contains a thermo-sensitive fluid which is affected by the heat conducted from the tip 19. The tip 19 and tube 20 are in part housed by the pilot housing 11 and a shield 21. The chamber defined in part by the shield 21 is in communication with an air inlet opening 22, formed in the appliance wall 14. Air outlet openings 23 are pierced in the shield 21. This arrangement insures the circulation of relatively cool air about the tube 20 and a portion of the tip 19. The remaining portion of the tip 19, which is housed in the cup 11, is exposed to the circulation of air which takes place through this cup. Upon the extinguishment of the pilot flame, the air circulation about the tip 19, and the end portion of the tube 20, will operate to quickly reduce the temperature of these parts of the device.

The tube 20 is connected to the interior of an expansible-contractible element 24, which may be constructed from a corrugated metal bellows. One end of the bellows 24 is secured in sealed relation to the fitting 25, which fitting connects the bellows 24 and the tube 20 in communicating relation. The chamber defined by the bellows and the tube is completely filled with a thermo-sensitive liquid.

As a convenient means of providing the connection between the conduit 20 and the fitting 25, the tube 20 may be soldered to the fitting 25. The fitting 25 is journaled in a bushing 26, which is received in the threaded opening 27, provided by the valve body 28. This bushing is provided with a wrench engaging flange or shoulder 26a by means of which it may be adjusted in the valve body.

The fitting 25 is provided with a locknut 29, which, when loosened, permits the adjustment of the bushing 26, and which, when tightened, serves to squeeze the packing washer 30 between the fitting 25 and the bushing 26 for the purpose of preventing the escape of gas from the interior of the valve body. The bellows 24 is provided with an apertured cap 31, the opening of which is closed by a pin 32. The aperture in the cap is provided for the charging of the thermostat with a thermo-sensitive fluid, after which operation the plug is inserted and then sealed with solder.

A cup-shaped valve head 33 is removably carried on the upper free end of the bellows 24. The valve head 33 is provided with an annular washer 34 of yieldable material, such as leather, which is arranged to contact with a valve seat 35 formed integrally with the valve body 28. A spring 36 is provided to urge the valve head towards its closed position. The spring abuts at one end against a removable valve cap 37, which is provided to permit access to the interior of the valve body.

The opening provided in the side of the valve which is closed by the valve cap 37 is of sufficient size to permit removal of all of the operating elements of the valve, thus facilitating both the machining and the assembling operations necessary in constructing the valve.

The outlet side of the valve body 28 is connected to a gas conduit 38, which in turn is connected to the gas burners (not shown) which are ignited by a pilot burner 5. With the valve parts in the position shown, after the ignition of the pilot burner has been accomplished, the heat of the pilot flame heats the tip 19 and causes the expansion of the fluid contained in the tube 20. The expansion and vaporization of the thermo-sensitive fluid serves to expand the bellows 24, whereupon the valve head 33 is raised from its seat 35, connecting the supply conduit 1 to the outlet conduit 38 for the purpose of supplying gas to whatever burners are connected to such conduit.

Upon the extinguishment of the pilot flame, the tip 19 and the adjacent portion of the conduit 20 cool, permitting the contraction and condensation of the fluid in the conduit 20, whereupon the bellows contracts and the spring 36 forces the valve head into closing engagement with its seat 35.

An important feature of this invention is that of controlling the amount of heat supplied to the thermo-sensitive liquid. In the construction shown in Fig. 1 this object is accomplished by providing a solid tip 19 above the flame of the pilot burner 5. This tip is connected to the end of the conduit 20 within which is contained the thermo-sensitive fluid. The end portion of the conduit 20, and the portion of the tip 19 which is connected thereto, are shielded from the flame of the pilot burner and are exposed to the circulation of cooling air by way of the openings 22 and 23.

Fig. 2 illustrates a modified form of construction in which the tip 61 is enclosed within a shield 62. The shield 62 is provided with holes 63 for air circulation. In this arrangement, the tube 20 is extended and sealed at its end, forming the heat responsive tip 61. The shield 62 is constructed from a material which is highly resistant to the corrosive action of the pilot flame. This form of tip construction permits the utilization of the full length of the tip 61 as a liquid container, as the shield 62 operates to prevent the thermo-sensitive liquid from reaching dangerously high temperatures. The shield 62 is provided with depressions 64 by means of which the tube is spaced from the tip 61.

In developing a filling reagent or thermo-sensitive liquid for this device, the following conditions were borne in mind:

The liquid should have a high boiling point, since the temperatures to which the operating thermostat of the valve is exposed often reach a high point, and it is evident that the boiling point of the liquid must be above this temperature in order for the valve to shut off if the pilot light should go out.

The liquid should have a low freezing point, since under certain conditions when the pilot is not burning, the device might be exposed to relatively low temperatures. Freezing of the liquid under such conditions would slow up the opening of the valve, since it would be necessary to first heat the entire bellows and housing sufficiently to melt the frozen reagent before the operation of the valve could be effected. If the reagent expands on freezing, rupture of the bellows would probably result if the device were exposed to freezing temperatures.

The liquid should have a very high decomposition temperature when in contact with the various metals used in the thermostatic device, as any amount of decomposition whatsoever changes the operating characteristics of the valve and excess decomposition would make the device useless as a safety pilot control. It was carefully determined that the decomposition temperature should be at or above six hundred degrees Fahrenheit.

The liquid should preferably have a low viscosity, since viscous liquids are difficult to handle in completely filling the device.

The liquid should have a moderate vapor pressure at temperatures between four hundred and fifty to five hundred degrees Fahrenheit, since if the pressure becomes too great at this temperature, which is the usual operating temperature, such excessive pressure will distort and strain the bellows, thus reducing its useful life span.

The liquid should be one which does not dissolve air readily, since in many cases liquids are oxidized in the presence of air at high temperatures.

The liquid should be non-toxic, both in the vapor and liquid phases, since if the device should burst or develop a leak, the liquid or vapor might escape into an inhabited dwelling.

The liquid should be inexpensive, since it requires from twenty to thirty cubic centimeters to fill a device, and the use of this amount of liquid prohibits the use of expensive reagents.

In the development of this device, an exhaustive amount of research work was done to determine the best materials for constructing the various parts of the device and the types of liquid available, and the effect of such liquids on the various materials which might be used in constructing the elements of the device.

Among the liquids discovered to be suitable as a filling reagent for the device, the following were included: ethers, as, for example, diphenyl oxide, amines, as, for example, aniline, hydrocarbons, as, for example, benzene, xylene and toluene, halogen derivatives of various compounds, as, for example, chlor-diphenyl oxide, chlorobenzene and orthodichlorobenzene. The filling reagents were tested with various metals and materials which might be used in the construction of the valve to determine whether or not these metals and materials catalyze any pyrolytic reaction, whether it be decomposition or a change to another chemical compound.

A large number of tests were made to determine the pyrolytic stability of various liquid filling reagents for the thermostatic device herein disclosed. In making the tests, glass tubes were used to contain the various filling reagents, and to determine whether there is any catalytic action between the filling reagents and various metals, and a number of metals were introduced with the filling reagents in such tubes. Among metals tested were Monel metal millings, copper millings, oxidized copper millings, sterling silver, nickel, and brass millings. The specific filling reagent was placed in the test tube in the absence of air, and the tube thereupon sealed and heated for a long period of time. After this continuous heating the tube was examined to determine whether or not any chemical changes had taken place or any gas was produced. As an example of such tests, the following, which were performed with the liquid xylene, are cited as illustrative:

In an effort to determine at what temperature various metals might cause the decomposition of xylene, tests, in accordance with the method employed, were run at 650° F. in a constant temperature oven for a considerable number of days. In the tests on xylene, various metals were tried, and in the case of nickel, specifically, it was found that the xylene did not decompose at this high temperature, and in a considerable majority of the tubes employed no gas was found to be present at the end of the tests. Control tests were also made by subjecting glass tubes containing xylene alone to the same temperature of 650° F. in a constant temperature oven for several days. Upon examination of these tubes, after the test, no decomposition, gas formation or any other change was noted.

Other tests employing cold rolled steel and Monel metal as catalysts were also run at 650° F. temperature, and in some instances it was found that these particular metals produced a slight decomposition of some of the chemical filling reagents. However, similar tests on these metals and others were run at slightly lower temperatures of, for example, 550° F., without showing decomposition of the liquid filler or the formation of gas.

Since the tests showed these various filling compounds were successful for the particular desired use, a large number of thermostatic devices were filled with the various liquid filling reagents disclosed in this application, and were subjected to continuous operation over a period of several months. For high temperature work, xylene, toluene, and orthodichlorobenzene were found to be very satisfactory filling reagents when used in connection with a metal which did not have any catalytic reaction therewith.

The foregoing specific tests are mentioned as examples of the tests carried out on the various filling reagents disclosed herein.

As previously stated in this specification, diphenyl oxide, chlorodiphenyl oxide and other halogen derivatives of aromatic compounds were found suitable as filling reagents as the result of the tests made.

Furthermore, it is to be understood that the particular methods and compounds disclosed, and the procedure set forth, are merely illustrative, and are presented for purposes of explanation and illustration, and that various equivalents of the comounds can be used and modifications of the procedure made without departing from the spirit of our invention.

What we claim is:

In a high temperature thermostatic device of the type including a valve, the combination of a bulb adapted to be subjected to heat, an expansible and contractable chamber connected to the valve for actuating the same, a tube connecting the bulb and chamber, and chlorinated diphenyl oxide filling the bulb, tube and chamber to the exclusion of air as a thermo-responsive liquid, the expansion and contraction of which in response to temperature changes of the bulb are communicated to the chamber for actuating the valve.

CARL F. PRUTTON.
JOHN T. MARVIN.